UNITED STATES PATENT OFFICE.

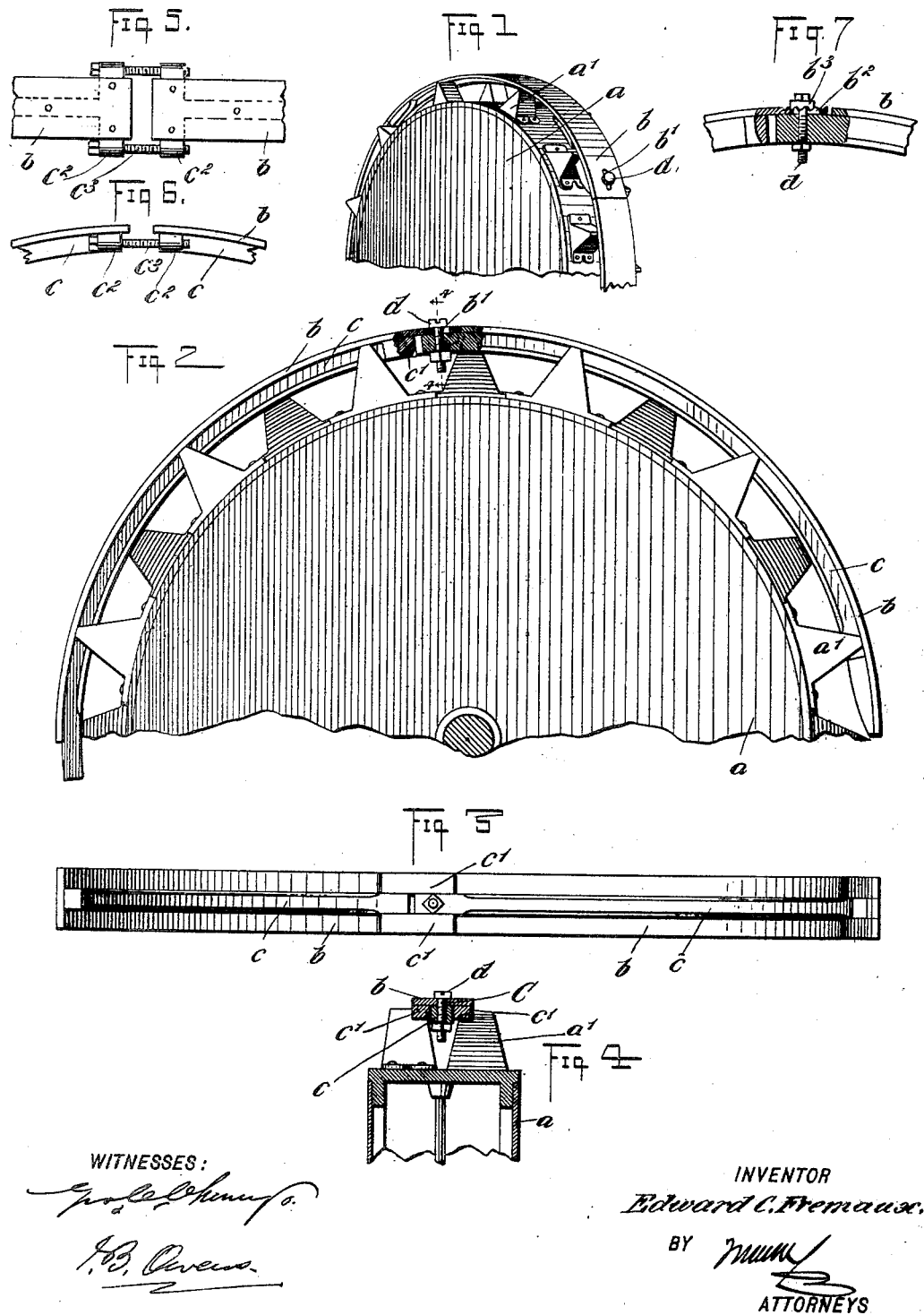

EDWARD CHARLES FREMAUX, OF RAYNE, LOUISIANA.

WHEEL ATTACHMENT.

SPECIFICATION forming part of Letters Patent No. 667,937, dated February 12, 1901.

Application filed October 3, 1900. Serial No. 31,905. (No model.)

*To all whom it may concern:*

Be it known that I, EDWARD CHARLES FREMAUX, a citizen of the United States, and a resident of Rayne, in the parish of Acadia and State of Louisiana, have invented a new and Improved Wheel Attachment, of which the following is a full, clear, and exact description.

This invention relates to a device for attachment to the wheels of agricultural machinery used in muddy countries—for example, the lugged wheels of rice-harvesting machines. In order to make the wheels of machines used in rice-fields take hold on the soft muddy soil, they are generally constructed with exaggerated lugs, (in practice about four inches long;) but when these machines are drawn over hard roads or used in fields of hard ground the lugs cause the machines to be jarred so much as to damage them, and also the team is subjected to a load greater than would be the case under other circumstances. Now therefore my invention resides in an attachment for such wheels whereby the wheels may have their peripheries rendered smooth when the exigencies of the occasion make the same desirable.

This specification is the specific disclosure of one form of my invention, while the claims define the actual scope of the invention.

Reference is to be had to the accompanying drawings, forming a part of this specification, in which similar characters of reference indicate corresponding parts in all the figures.

Figure 1 is a fragmentary perspective view of the invention. Fig. 2 is a fragmentary side view. Fig. 3 is an inside plan of the attachment. Fig. 4 is a section on the line 4 4 of Fig. 2. Figs. 5 and 6 are respectively a partial plan and a partial side elevation of a modified form of fastening device employed, and Fig. 7 is a partial sectional side elevation of a modified construction hereinafter more particularly described.

$a$ represents the wheel, and $a'$ the lugs, which latter are generally arranged staggering or in two parallel rows on the broad periphery of the wheel.

The attachment consists of an annular band $b$, in whole or in sections, arranged to encircle the wheel and lie over the lugs to cover the same, and thus provide the wheel with a uniform periphery. The band is of such a width that it will lie over the inner portions of the lugs, leaving the outer edges still exposed. When the wheel so equipped is used on hard ground, the band $b$ alone will engage the ground, and then the wheel will travel on a smooth and uniform rim. Should the wheel run into soft ground, the outer edges of the rims (being still exposed) will sink with the band into the soft earth and will act to cause the wheel to take hold on the ground, as before explained. In order to prevent the band from shifting laterally off the lugs $a'$, I form on the inner surface of the band a longitudinal rib $c$, which lies just between the rows of lugs and engages the same to prevent lateral displacement of the band.

According to the construction here illustrated, the band is formed into four quadrantal sections, the whole making a complete circle extending around the wheel. Each section carries a section of the rib $c$, and one end of each rib-section has two extensions $c'$, which are located at the sides of the rib and extend parallel with each other, as best shown in Fig. 3. The other end of the rib-section is projected beyond the band-section, so that when the several sections of the band are in place the projected ends of the rib-sections will respectively feed between the members of the adjacent pairs of extensions $c'$, thus preventing the sections of the band from independent transverse movement. This arrangement is best illustrated in Fig. 3. This figure, as well as Fig. 2, illustrates two of the quadrant-sections applied to the wheel, one-half of which is shown in Fig. 2. It is understood, of course, that two of the quadrantal sections are omitted from this view. For holding the sections together bolts $d$ are provided, which are passed through the projected ends of the rib $c$ and through slots $b'$ in the respectively adjacent ends of the band-sections. By means of these slots the band may be adjusted properly to fit on the wheel. The offset extensions $c'$ of the rib $c$ serve not only to effect proper joints of the rib-sections, but also to prevent the band $b$ from working circumferentially on the wheel, which latter effect is due to the engagement of the extensions $c'$ against the side faces of certain of the lugs $a'$. (See Fig. 2.)

This band attachment may obviously be taken off the wheel at any time when the condition of the soil renders the lugs $a'$ of the wheel advantageous.

In order to prevent the bolt $d$ from slipping, the end of the band $b$ may be serrated, as shown at $b^2$ in Fig. 7, and the bolt fitted with a serrated washer $b^3$, also shown in said figure.

A modified form of fastening device for the ends of the band is shown in Figs. 5 and 6, in which lugs $c^2$ project from the ends of the ribs $c$ transversely beyond the band and carry screws $c^3$, by which the parts are connected and which enable them to be drawn together with any desired degree of tightness.

Having thus described my invention, I claim as new and desire to secure by Letters Patent—

1. A wheel attachment, comprising a band made up of arc-shaped sections, each section of the band having a longitudinal rib and one end of each rib-section having offset extensions and the other end of each rib-section being projected beyond the band-section to lie between the extensions of the contiguous rib-sections, and a means for fastening the projected ends of the rib-sections in place.

2. A wheel attachment, comprising a band made up of a number of sections, each section having a longitudinal rib, and one end of each rib having offset extensions running parallel with each other and serving to receive the other end of the contiguous rib between them and having means for holding the band-sections together.

3. The combination with a wheel having lugs thereon arranged in parallel rows, of a band extending around the wheels over the lugs, and a centrally-disposed rib on the interior of the band, the rib lying between the rows of lugs, for the purpose specified.

In testimony whereof I have signed my name to this specification in the presence of two subscribing witnesses.

EDWARD CHARLES FREMAUX.

Witnesses:
B. M. PEARCE,
H. C. IRION.